Nov. 20, 1934.  E. J. W. RAGSDALE ET AL  1,981,708
STEP CHISEL WELDER
Filed April 22, 1932   2 Sheets-Sheet 2
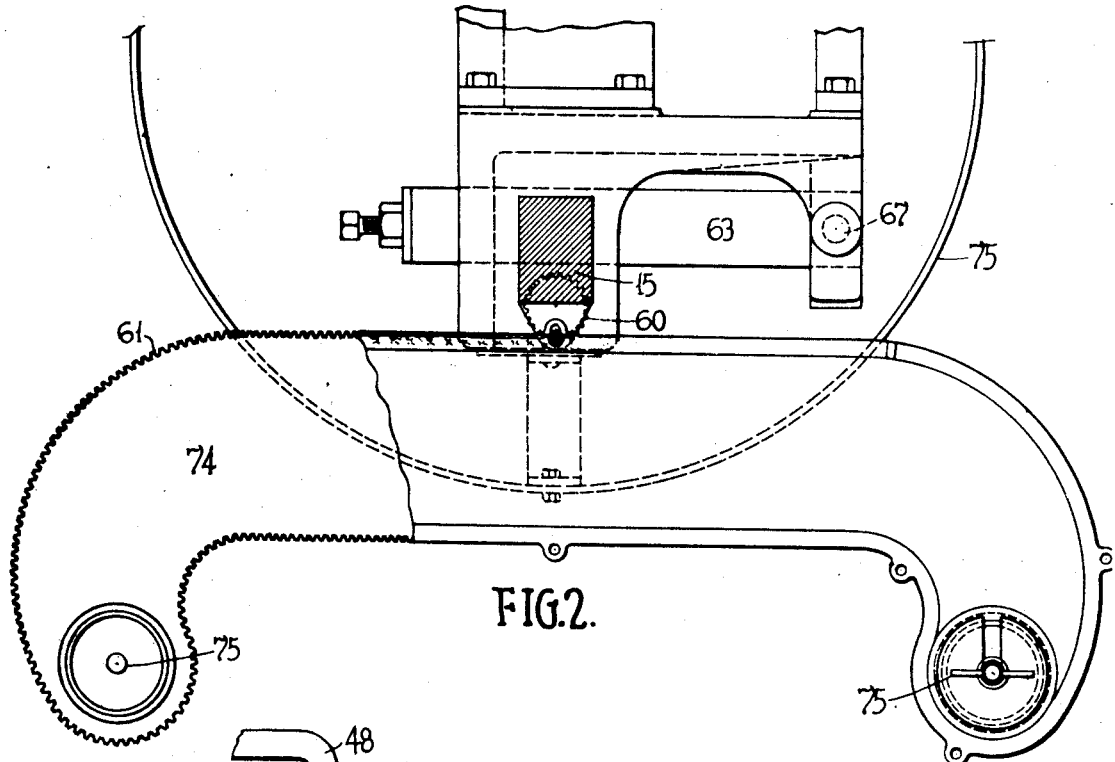
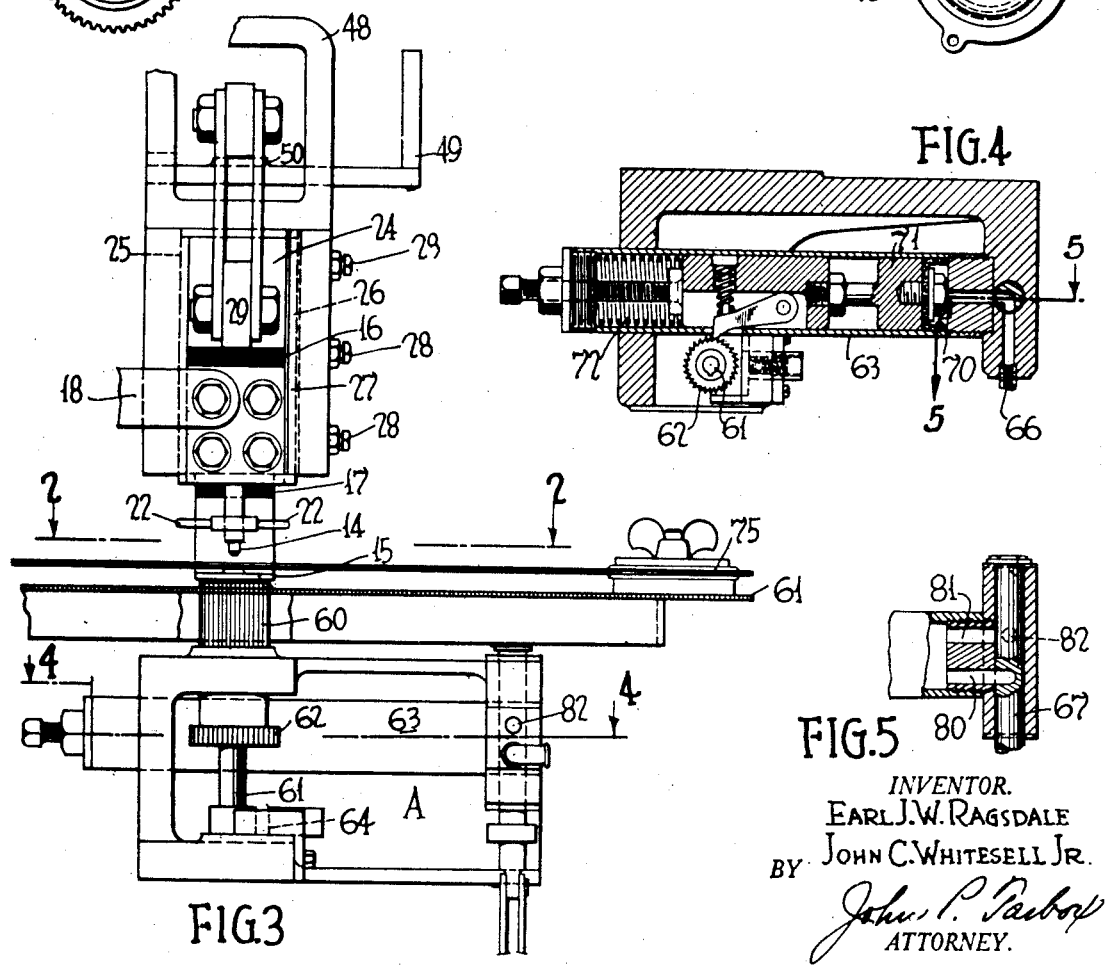
INVENTOR.
EARL J. W. RAGSDALE
JOHN C. WHITESELL JR.
BY
ATTORNEY.

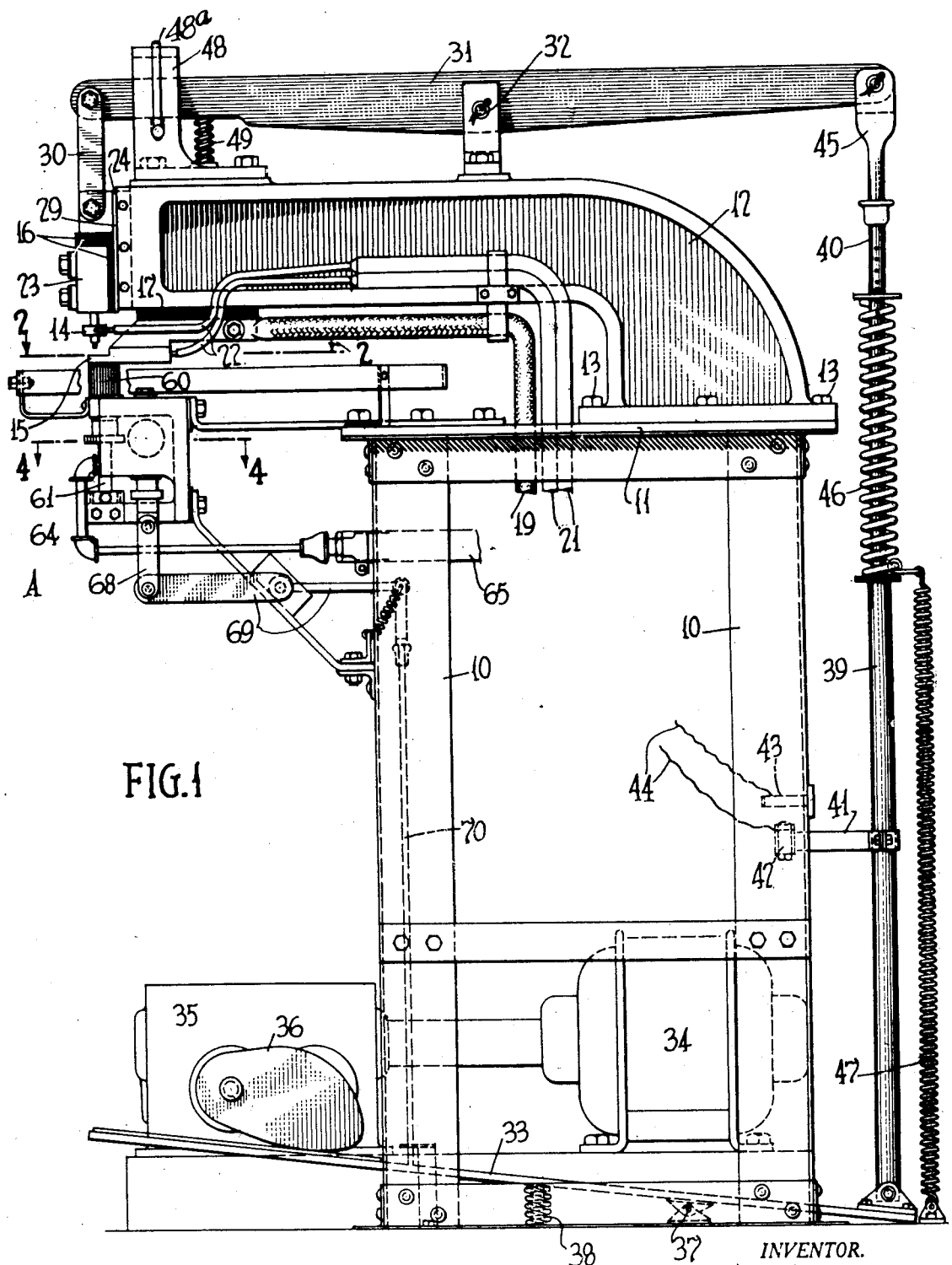

Patented Nov. 20, 1934

1,981,708

UNITED STATES PATENT OFFICE 1,981,708

STEP CHISEL WELDER

Earl J. W. Ragsdale and John C. Whitesell, Jr., Norristown, Pa., assignors to Edward G. Budd Manufacturing Company, Philadelphia, Pa., a corporation of Pennsylvania Application April 22, 1932, Serial No. 606,810

6 Claims. (Cl. 219—4)

Our invention relates to electric welding and more particularly to spot-welding machines adapted for automatic cooperation between the machine and the work carrier.

It is desirable in the mass production of spot-welded sheet metal structures to have mechanism such that the assembled parts may be welded at a plurality of consecutive predetermined points whereby each individual structure will have, comparatively speaking, the same strength, and joints in substantially the same relative positions.

We attain the above mentioned desirable objects and others inherent in our machine by using a work positioning means such as a rack of work contour and adapting the same for cooperation with a piloting means such as a pinion operatively connected to the welding electrodes in such manner that the work receives a step by step positioning movement co-ordinated with the welding operation of the machine.

To attain the above desirable objects we have determined that if one gear meshing with another of larger or smaller radius is used, and if one of the gears is connected to a part to be operated upon, suitable connecting parts may be constructed so that the welding operation will always take place in the same relative point of contact between the two gears. To carry this principle into practice in regard to work, not having circular contour, it is essential to have one of the gear members replaced by a rack co-operating with a pinion. If the rack takes the contour of the zone of the assembled work parts which are to be operated upon and is meshed with a piloting pinion upon the welding machine, the welding operation may be performed consecutively upon the work, always having the weld occur at the same point of the contour with respect to the tooth formation of the rack and pinion.

Our invention will be better understood from the following description when considered in connection with the accompanying drawings and its scope will be pointed out in the appended claims.

In the accompanying drawings wherein like ordinals represent corresponding parts in the various figures:

Fig. 1 is a side elevation of a spot-welding machine constructed in accordance with our invention.

Fig. 2 is a partial plan view along the line 2—2 of Figures 1 and 3.

Fig. 3 is a partial front elevation of the working parts of my machine.

Fig. 4 is a cross-section through the step by step mechanism on the line 4—4 of Figure 3.

Fig. 5 is a vertical cross-section showing the valve mechanism on line 5—5 of Figure 4.

A machine constructed in accordance with our invention as illustrated in Figure 1 comprises a framework 10 composed of suitable horizontal and vertical structural members for supporting the working parts of the machine. Mounted upon this framework is a table 11 having secured thereon a substantially L-shaped cantilever arm 12. This arm is fastened to the framework by suitable securing means as, for example, bolts 13.

Mounted upon the outer extremity of the supporting arm 12 are the electrodes or dies 14 and 15 which are insulated therefrom by a suitable insulating material 16 and 17. The lower electrode 15 is rigidly secured to the cantilever supporting member while the upper electrode 14 is relatively movable. The electrodes 14 and 15 are supplied with power by means of electric cables 18 and 19, one of which can be seen in each of the Figures 1 and 3. The power supply is not shown as it is not a part of my invention and any suitable connections considering the arrangement and construction of the machines and the location of the same with respect to the said power supply may be used. For the purpose of maintaining the electrodes at a safe operating temperature, they are constructed with a hollow formation or an encircling cooling coil to receive a circulating cooling medium from the pipes 21 through reduced connections 22. The upper or movable electrode 14 is secured to a block 23 which receives the electrical connection 18. The block is mounted upon and insulated from a dove-tailed element 24 which is arranged for vertical movement in the keyways 25 and 26. An adjustable gib 27 is located in the right hand side with adjusting bolts 28 to compensate for any lost motion. The member 24 has a projection 29 thereon with a suitable hole therein for receiving the toggle connection 30 which in turn connects to the relatively horizontal lever arm 31 mounted upon the upper surface of the member 12 at the fulcrum 32. The opposite extremity of the lever arm 31 is connected by an adjustable lost motion connection at the rear of the machine to a lever arm 33 at the base of the machine shown in its normal inactive position.

Mounted upon the base of the supporting framework 10 is a suitable power source shown as an electric motor 34. The motor 34 is driven continuously during the operation of the machine and by means of gearing contained in the gear housing 35, the cam 36, and interconnecting mechanism it is possible to achieve a reciprocating movement of the movable part 14. The lever 33 is pivoted at 37 and is maintained in inactive position by means of a spring 38 of suitable strength. Mounted to the rear ends of the levers 33 and 31 is the lost motion connection comprising two telescoping members 39 and 40. The member 39 is hollow and has mounted in substantially midposition thereof the arm 41 carrying the movable contact 42 adjusted for contact with the stationary contact 43. These contacts form the controlling means for the power circuit supplying energy to the electrodes through the connections 18 and 19. The member 40 telescoping within the member 39 has upon its upper connection a bifurcated member or yoke 45 suitably pivoted to the member 31. The rod 40 carrying the yoke 45 is connected by a plurality of springs 46 and 47 to the base of the machine. The spring 46 serving as the lost motion connection between the two elements 40 and 39 whereby the electrodes may be caused to close and thereafter a predetermined movement of the member 39 will occur before the contact arm 41 completes the circuit through the member 43. The spring 47 serves to assist the spring 38 at the bottom of the machine and a spring 49 at the top thereof to keep the electrodes open at all times except during operation thereof. Mounted upon the extreme top of the machine is a framework 48 carrying a lock lever 48a which has a projection 50 positioned in such a manner that when the lever is in rest position, as shown, the movable electrode is locked in open position through the relation of the portion 50 with the lever arm 31.

The description so far more particularly relates to the electrode connections and operations. An essential and important part of our invention is now to be described, being the piloting mechanism generally indicated at A. The piloting mechanism includes a primary piloting pinion 60 mounted directly beneath the welding electrodes and a rack 61 of work contour fixedly secured to the assembled sheet metal members. The co-ordination of the aforementioned elements operates to position the work in relation to the electrodes of the machine. The piloting pinion 60 is mounted upon the shaft 61 which carries a ratchet wheel 62 for co-operation with a step by step mechanism shown as being a pneumatic motor 63. The lower end of the shaft 61 has a one way clutch of simple construction 64 to limit the operation of the piloting pinion to one direction only. The pneumatic motor receives air pressure from the pipe 65 connected by suitable tubing to the opening 66 in the end of the motor. The piston valve 67 is connected by a suitable toggle member 68 to the cross lever 69 which is centrally pivoted to the framework. The lever 69 is connected thru the lever 70 to the lower lever 33, and the pneumatic motor may in this manner be operated by means of the cam 36 synchronously with the operation of the welding electrodes. When the piston valve 67 moves upward because of the movement of the cam, air is admitted to the cylinder 70 forcing the piston 71 to the left against the resistance in spring 72 thereby operating the ratchet wheel 62 one step which in consequence thereof moves the piloting pinion 60 one step also. As the piston valve 67 moves upward, the port 80 which was opened to receive the air is now closed and the port 81 is opened to the exhaust port 82 in the valve housing thereby exhausting the cylinder and repositioning the pneumatic motor in inactive status. This sequence of operation continues consecutively as long as the machine continues to operate and is co-ordinated to the operation of the welding electrodes.

In Fig. 2 we have shown a jig or work positioning member 73 having a rack 61 of contour corresponding to the zone of the work to be operated upon by the welding electrodes. It is readily apparent that the rack indicated is not the only type jig that may be used, but any other rack and jig corresponding to the nature of the work to be welded, may be used. The sheet metal parts may be secured to the rack or jig 74 by means of suitable fastening members generally indicated at 75.

The rack on the jig is held in contact with the piloting pinion 60 positioning the work with respect to the electrodes by means of the properly adjusted guide members 75 mounted to the framework of the machine.

In the operation of our machine the work is secured to the rack and is then placed upon the guide 75 with the rack 61 co-operating with the piloting pinion 60 of the machine. The power switch is closed starting the electric motor 34 into operation thereby causing a periodic opening and closing of the electrodes and the timed electrical connection thereto for the purpose of making the weld. After each spot weld is made, the piloting pinion jogs the work ahead a predetermined distance positioning the same to the electrodes for the next consecutive weld. This operation continues until the entire piece of work has been welded throughout the joint. After the part has been completed it may be removed from the machine and another part of the same contour may be then placed in the machine for welding. It will be readily apparent that large quantity production may be achieved on a machine of this type and accurate positioning of the welds obtained without requiring any judgment on the part of the operator.

Our invention is susceptible of modifications and we aim to cover by the appended claims, all modifications within the true spirit and scope of our invention.

We claim as our invention:

1. A machine for assembling sheet metal parts comprising, in combination, a jig to receive the members and hold them in final assembled relation, electrical welding means including electrodes for uniting said members while held in assembled position, and rack and pinion means associated respectively with said jig and welding means, and in co-operative relation therebetween, to position the work in consecutive predetermined welding position as to said electrodes.

2. In a spot welding machine, in combination, step-by-step work piloting mechanism, relatively movable welding dies, power driven means arranged to automatically operate said dies and piloting mechanism in synchronism and means including a rack of work contour fixedly associated with the work and adapted for temporary cooperation with said piloting mechanism during the positioning and welding operations.

3. In a spot welding apparatus, the combination, of relatively movable electrodes, actuating mechanism for said electrodes, a work positioning jig having a part of work contour secured to the work and independent of said machine, and means on said machine to position the work thru the co-operation of said work contour part in operative relation to and in synchronism with the operation of said electrodes.

4. In a spot welding machine, step by step piloting means comprising an exposed pinion, relatively movable welding dies, power driven means arranged to automatically operate said piloting means and said welding dies in synchronism, and a welding jig for holding the parts to be welded in final assembled relation, said jig having a contour conforming to the contour of the parts to be welded, the contour of said jig being provided with a series of teeth adapted to engage the teeth of the pinion of said step by step piloting mechanism.

5. In a spot welding machine, step by step piloting means comprising an exposed pinion, relatively movable welding dies, power driven means arranged to operate said piloting means and said welding dies in synchronism, and a welding jig having means thereon for securing the parts to be welded in final assembled relation, said jig having a toothed rack formed thereon of a conformation the same as the line on which said parts are to be welded, the teeth of said rack adapted to engage the teeth of the exposed pinion of said step by step piloting means.

6. In a spot welding machine having a pair of relatively movable welding dies, step by step piloting means having an exposed pinion adjacent said welding dies, power driven means arranged to automatically operate said piloting means and said welding dies in synchronism, a work holding means comprising means for holding the parts to be welded in final assembled relation, said work holding means having a toothed rack therearound of a conformation the same as the line on which said parts are to be welded, said teeth adapted to engage the teeth of the exposed pinion of said piloting means, said work holding means being independent of said welding machine except for the engagement of said rack and pinion.

EARL J. W. RAGSDALE.
JOHN C. WHITESELL, Jr.